Nov. 17, 1942.　　　S. A. MANTELL　　　2,302,337
SIGNAL ATTACHMENT FOR FISHING POLES
Filed Nov. 17, 1941
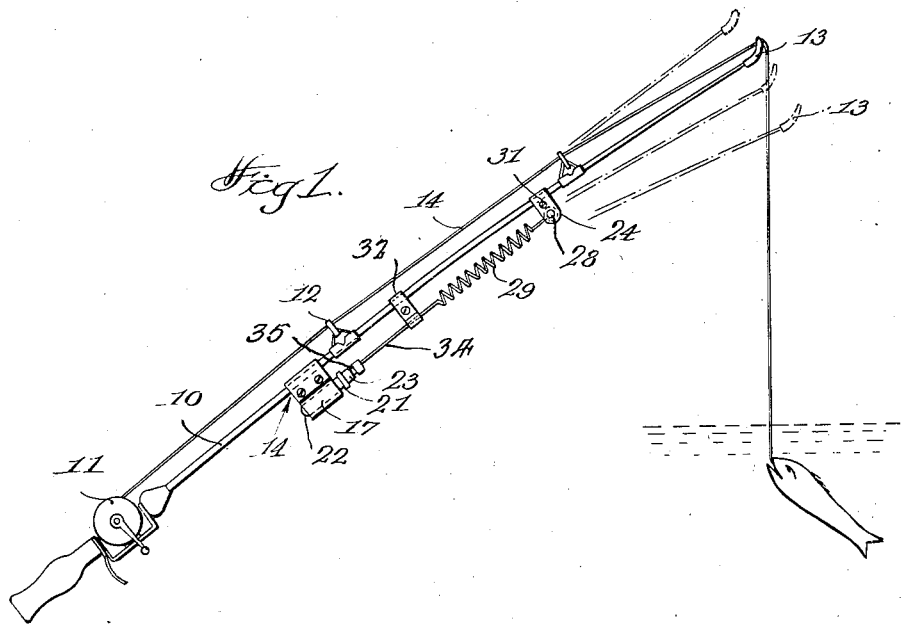
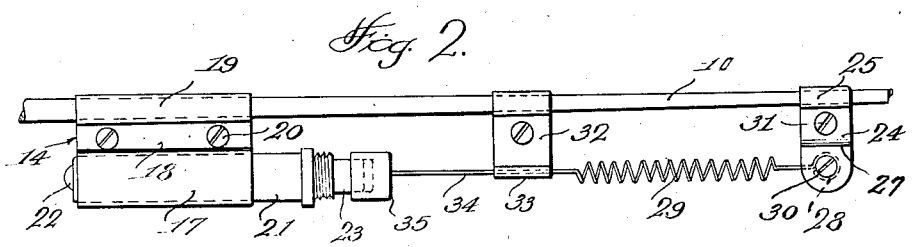
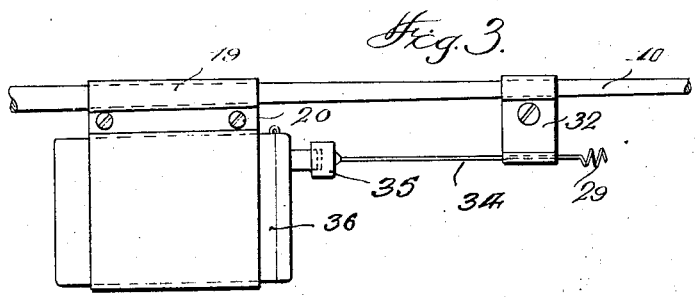
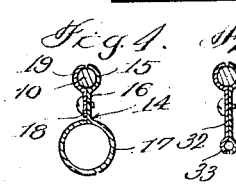
Inventor
Samuel A. Mantell Patented Nov. 17, 1942

2,302,337

UNITED STATES PATENT OFFICE 2,302,337

SIGNAL ATTACHMENT FOR FISHING POLES

Samuel A. Mantell, Niagara Falls, N. Y.

Application November 17, 1941, Serial No. 419,476

5 Claims. (Cl. 43—16)

This invention relates to a signal means for fishing rods for indicating when a fish is active around a hook or hooks associated with a fishing line, and it consists in the constructions, arrangements and combinations herein described and claimed.

It is a particular object of the invention to provide a signal means, either visual or audible, which may be readily attached to fishing poles now on the market, without in any way requiring alteration of the pole.

It is also an object of the invention to provide a signal means which is operable only when the fishing pole is flexed, as will be the case when a fish bites upon a hook imparting a pull to the fish line.

It is a still further object of the invention to provide a simple and novel means for attaching the device to a rod and including means for adjusting the signalling device per se, so as to be employed in either still or running water.

Additional objects, advantages and features of invention will be apparent from the following description considered in conjunction with the accompanying drawing, wherein Figure 1 is a side elevation of a fishing rod having my signal device installed and illustrating its use.

Figure 2 is an enlarged fragmentary view of the signal device.

Figure 3 is a similar view of a modified form of the signal device.

Figure 4 is a cross section on the line 4—4 of Figure 2.

Figure 5 is a cross section on the line 5—5 of Figure 2.

Figure 6 is a similar view on the line 6—6 of Figure 2.

There is illustrated a fishing rod 10 of any usual construction including a reel 11, line guides 12 and tip guide 13, a line 14 being wound upon the reel and threaded through the guides as is customary. A hook or hooks and sinker will be employed, but are not shown since they form no part of the invention.

Upon the rod 10, spaced outwardly of the reel 11, there is a bracket 14 which comprises a clip portion 15 of semi-circular formation of a size complemental to the diameter of the rod 10. The clip 15 includes a shank portion 16 formed intermediate its length with a loop 17 having a shank portion 18 adapted to lie flush against the shank 16, the shank 18 terminating in a semi-circular clip 19 adapted to partly encircle the rod 10 in opposed relation to the clip 15.

The shanks 16 and 18 are apertured and tapped for reception of machine screws 20, for drawing the clips snugly upon the rod 10, as well as to draw the loop 17 firmly about a battery case 21.

The case 21 consists of a standard flashlight construction, of the "pencil" type, including a bulb 22 at one end and a "push" type switch 23 at the other end. The construction of these flashlights is well understood in the art and a detailed explanation or illustration is not necessary to the understanding of the invention.

An anchor clip 24 consisting of a loop 25 adapted to encircle the rod for securement thereto is provided, mounted a suitable distance outwardly of the bracket 14, the leg portions 26 of which are offset as at 27, for reception of an eyelet 28 of a helical spring device 29. The leg portions 26 are apertured and tapped for a machine screw 30, the latter passing through the eyelet 28 for retention of the spring. A machine screw 31 is also engaged through tapped apertures which function as a means for securing the clip to the rod.

Intermediate the bracket 14 and the anchor clip 24, a guide bracket 32 is provided, of a construction similar to that of the bracket 14, but in this instance, the loop 33 is of much smaller diameter, since it functions for support of a wire 34 extended rearwardly from the spring 29.

The wire 34 and the spring 29 as well as the eyelet 28 are formed integrally from a suitable length of steel wire, the rear end of the wire having fixed thereto a cap 35, of a size to freely encircle the switch button 23; the bottom of the cap normally being held spaced from the button, as shown in Figure 2.

As illustrated in Figure 1, my signal device is mounted upon the underside of the rod, and it will be apparent that when the rod is flexed as indicated by the dotted lines in Figure 1, the wire 34 will be caused to move rearwardly, moving the cap 35 in a similar direction, so as to engage and force the switch button 23 so as to energize the bulb 22. Since fish will ordinarily pull upon the line a series of times, an intermittent flashing of the bulb will occur, giving ample warning to the fisherman.

The spring 29 will function as a cushioning means where a violent pull upon the line may occur.

It will be apparent that the point of operation of the switch 23 may be varied by sliding the case 21 forwardly or rearwardly as required, since the case is frictionally held in the loop 17. Such a resetting of the case will be involved when fishing in still water, and a change is made to swift water, since in one instance a less sensitive control is required.

In Figure 3, the flashlight has been replaced by a buzzer 36, shown conventionally. The operation is the same as first described, the only difference being that an audible signal is given rather than a visual one.

While I have shown and specifically described my invention, this is by way of illustration only, and I consider as my own all such modifications in construction as fairly fall within the scope of the appended claims.

I claim:

1. In combination, a fishing rod including a line, a signal device fixed to the rod at a point adjacent the hand grip of the rod, guide means on the rod, an anchor means on the rod in advance of the guide means, a wire member fixed to the anchor means and extended through the guide means, said signal device having a switch longitudinally movable, and said wire having means for engaging and moving the switch longitudinally of the rod under flexing action of the rod.

2. The structure of claim 1 in which the wire includes a helical spring yieldable under excessive flexing of the rod.

3. The structure of claim 1 in which the signal device is longitudinally adjustable upon the rod.

4. The structure of claim 1 in which the signal device includes a visual intermittent signal under repeated flexing of the rod.

5. The structure of claim 1 in which the signal device includes an audible intermittent signal under repeated flexing of the rod.

SAMUEL A. MANTELL.